United States Patent [19]
DeBlasi

[11] 4,111,916
[45] Sep. 5, 1978

[54] PRINTING INK RESINS

[75] Inventor: Douglas S. DeBlasi, Clifton, N.J.

[73] Assignee: Sun Chemical Corporation, New York, N.Y.

[21] Appl. No.: 793,747

[22] Filed: May 4, 1977

[51] Int. Cl.² ............................................... C08G 18/62
[52] U.S. Cl. ......................................... 528/75; 106/20; 106/308 M; 528/78; 260/37 N
[58] Field of Search .......... 260/77.5 AQ; 106/308 M, 106/20

[56] References Cited
U.S. PATENT DOCUMENTS 3,182,043  5/1965  Kirkland ...................... 260/77.5 CR
3,816,425  6/1974  Canton et al. ............... 260/77.5 AQ

*Primary Examiner*—M. J. Welsh
*Attorney, Agent, or Firm*—Cynthia Berlow

[57] ABSTRACT

Cyanoethylated polyurethanes suitable for use as hard ink resins are prepared by the steps of (1) reacting a polyol having a functionality of at least 3 with an alkyl acrylate or a cyanoethylation agent such as acrylonitrile, (2) acidifying the product adduct, and (3) reacting the remaining hydroxyl groups with a polyisocyanate and optionally at least one monofunctional reactive hydrogen-containing compound and/or a glycol to yield a urethane polymer with terminal nitrile groups at repeating branch points.

4 Claims, No Drawings

PRINTING INK RESINS

This invention relates to polyurethanes. More particularly it relates to cyanoethylated polyurethanes, processes for preparing them, and their use as ink resins.

To be suitable for use in printing inks, especially for flexographic inks, resins should be solids that are soluble in alcohol; compatible with nitrocellulose; and impart to the ink good adhesion to the substrate, gloss, flexibility, and heat resistance.

It has now been found that certain urethane polymers have these desired properties that make them particularly useful as hard ink resins. The novel resins of this invention are cyanoethylated polyurethanes, generally prepared by the steps of (1) partially cyanoethylating, e.g., reacting with acrylonitrile under basic conditions, a polyol having a functionality of at least 3, (2) acidifying the resulting adduct, and then (3) reacting the remaining hydroxyl groups with a polyisocyanate and, optionally, at least one monofunctional compound having a reactive hydrogen group to yield a urethane polymer with terminal nitrile groups at repeating branch points.

Alternatively the cyanoethylated polyurethanes of this invention may be prepared by the steps of (1') reacting the polyisocyanate with excess polyol, optionally in the presence of the monofunctional reactive hydrogen-containing compound, and then (2') cyanoethylating the remaining hydroxyl groups to yield the urethane polymer.

The reactions may be generally illustrated by the following equations in which R is a hydrocarbon group with a valence of n, R' is

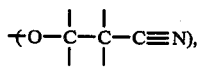

$n$ is an integer of 3 to about 10, $x$ is an integer of 1 to about 8, and $n-x$ is 2 or 3; for purposes of illustration only, toluene diisocyanate represents the polyisocyanate:

I (1) 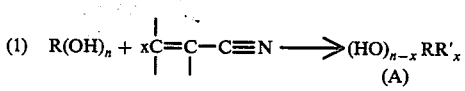

(2) (A) + 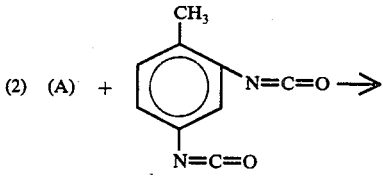

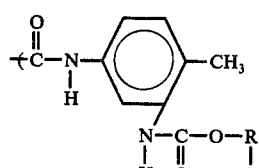

(1') R(OH)$_n$ + 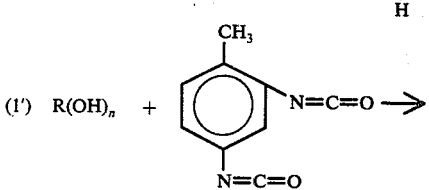

-continued

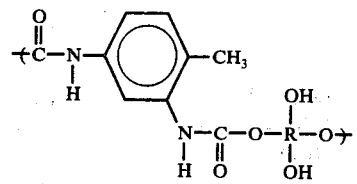
(B)

(2') (B) + 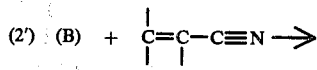

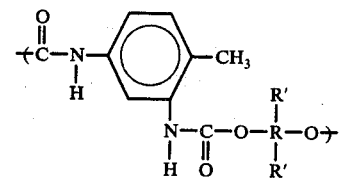

In equations I, the reaction of step (1) generally takes place at a temperature within the range of about 25 to 75, and preferably between about 40° to 55,° C.; the reaction of step (2) generally takes place at a temperature within the range of about 60 to 120, and preferably between about 75° to 100,° C.

The polyol may be any low molecular weight molecule containing at least 3 hydroxyl groups, such as for example glycerol; trimethylolethane; trimethylolpropane; pentaerythritol; dipentaerythritol; tripentaerythritol; sorbitol; their alkoxylated derivatives, e.g., ethoxylated and propoxylated trimethylolethane, ethoxylated and propoxylated trimethylolpropane; and ethoxylated and propoxylated pentaerythritols; ethoxylated and propoxylated ethylene diamine; and the like, and mixtures thereof.

The cyanoethylation agent may be acrylonitrile. It is within the scope of this invention to react the polyol with a lower alkyl acrylate, such as methyl acrylate, ethyl acrylate, butyl acrylate, 2-ethylhexyl acrylate, or the like, instead of acrylonitrile with comparable results.

Any suitable organic aliphatic, cycloaliphatic, heterocyclic, or aromatic polyisocyanate can be used, such as for example 2,4-toluene diisocyanate, 2,6-toluene diisocyanate, xylene diisocyanate, isophorone diisocyanate, 1,4-phenylene diisocyanate, hexamethylene diisocyanate, 1,4-naphthalene diisocyanate, 4,4'-methylene-bisphenyl diisocyanate, butylene-1,4-diisocyanate, cyclohexylene-1,2-diisocyanate, cyclohexane-1,4-diisocyanate, benzene-1,2,4-triisocyanate, toluene-2,4,6-triisocyanate, 4,4'-dimethyldiphenylmethane-2,2',5,5'-tetraisocyanate, and the like, and mixtures thereof.

In order to obtain certain properties, such as hardness, in the product polymer, the reactants may include one or more monofunctional compounds having a reactive hydrogen, such as a mercaptan, a monoalcohol, a primary or secondary amine, or the like, or a mixture of these, and/or a glycol.

Any of a wide variety of glycols can be used, including but not limited to ethylene glycol, propylene glycol, neopentyl glycol, cyclohexanedimethanol, N-methyl diethanolamine, 1,4-butanediol, 1,6-hexanediol, and the like, and their mixtures.

The monoalcohol or amine generally has the formula R—O—H, R—S—H, or

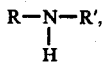

where R and R' is each a phenyl or an alkyl group having up to 20 carbon atoms and may be the same or different.

Typical examples include ethanol, 2-ethyl hexanol, hydroabietyl alcohol, N,N-dimethyl ethanolamine, di-n-butyl amine, dibenzyl amine, and so forth, as well as mixtures of these. It is within the scope of this invention to use as the alcohol the monohydroxyl product of the reaction of $R(OH)_n$ with $n-1$ equivalents of acrylonitrile, where R and n are defined as above.

The invention and its advantages will be better understood with reference to the following illustrative examples, but it is not intended to be limited thereto. In the examples, the parts are given by weight unless otherwise specified. Unless otherwise indicated, when the ingredient is solid at room temperature, the mixture may be heated to melt the solid ingredient, or it may be used in a mixture with liquid ingredients.

EXAMPLE 1

(A) One equivalent of acrylonitrile was added slowly to a mixture of 2 equivalents of a pentaerythritol polyoxyalkylene derivative (BASF Wyandotte's Pluracol PEP 550 prepared by the reaction of pentaerythritol and propylene oxide and characterized by 4 secondary hydroxyl groups each joined to a central carbon atom by an oxyalkylene chain and having an average molecular weight of 500) and 0.1 per cent of sodium methylate in a closed reaction flask fitted with a stirrer, a thermometer, a dropping funnel, and an inert gas inlet; heated for an hour at 45° C. with stirring under a blanket of nitrogen and then further heated at 55° C. for an additional hour. The pH of the product was adjusted to 4.5 with concentrated sulfuric acid.

(B) 4.6 Equivalents of an 80/20 mixture of 2,4- and 2,6-toluene diisocyanate and 1.2 equivalents of ethylene glycol were charged to a closed reaction flask equipped with a stirrer, a thermometer, a dropping funnel, and an inert gas inlet and heated for ½ hour at 80° C. with stirring under a blanket of nitrogen. 2.4 Equivalents of the product of part (A) and 0.05 percent (based on the total charge) of dibutyltin dilaurate were added and the reaction continued for ½ hour at 80° C. 1.0 Equivalent of di-n-butyl amine was added to the mixture uniformly over a period of ½ hour. The progress of the reaction was followed by the disappearance of the strong I.R. band for Ar—N=C=O at 2255 cm$^{-1}$; when this absorption ban vanished, the product, a pale yellow amorphous solid softening at room temperature, was discharged.

EXAMPLE 2

The procedure of Example 1 was repeated except that the pentaerythritol polyoxyalkylene derivative was BASF Wyandotte's Pluracol PEP 450 having an average molecular weight of 405 and the catalyst was potassium t-butoxide. The results were comparable.

EXAMPLE 3

The procedure of Example 1 was repeated except that the pentaerythritol polyoxyalkylene derivative was BASF Wyandotte's Pluracol PEP 650 having an average molecular weight of 594. The results were comparable.

EXAMPLE 4

The procedure of Example 1 was repeated except that 1,4-cyclohexanedimethanol was used instead of ethylene glycol. The product softened at 64° C.

EXAMPLE 5

The procedure of Example 1 was repeated except that 1,4-cyclohexanedimethanol was used instead of ethylene glycol and hydroabietyl alcohol was used instead of dibutyl amine. The product softened at 70° C.

EXAMPLE 6

The procedure of Example 1 was repeated except that hydroabietyl alcohol was used instead of dibutyl amine. The product softened at 68° C.

EXAMPLE 7

The procedure of Example 1 was repeated except that a mixture of ethylene glycol and a saturated aliphatic hydroxyl-terminated polyester diol (Mobay's Multrathane R-14) was used instead of ethylene glycol and hydroabietyl alcohol was used instead of dibutyl amine. The product softened at 61° C.

EXAMPLE 8

The procedure of Example 1 was repeated with each of the following instead of acrylonitrile: methyl acrylate, ethyl acrylate, butyl acrylate, and 2-ethylhexyl acrylate. The results were comparable.

EXAMPLE 9

The procedure of Example 1 was repeated with each of the following instead of Pluracol PEP 550: glycerol, pentaerythritol, ethoxylated trimethylolpropane, and propoxylated ethylene diamine. The results were comparable.

EXAMPLE 10

The procedure of Example 1 was repeated except that each of the following was used instead of the mixture of 2,4- and 2,6-toluene diisocyanate: 2,4-toluene diisocyanate, 4,4'-methylene-bis-phenyl diisocyanate, xylene diisocyanate, isophorone diisocyanate, and toluene-2,4,6-triisocyanate. The results were comparable.

EXAMPLE 11

The procedure of Example 1 was repeated except that the ethylene glycol and the di-n-butyl amine were omitted. The product polymer was softer than that of Example 1.

EXAMPLE 12

A red ink was prepared from the following ingredients:

|  | Per cent |
|---|---|
| product of Example 1 | 20 |
| ethanol | 56 |
| calcium red 2B | 11 |
| nitrocellulose | 4.55 |
| isopropanol | 1.95 |
| n-propyl acetate | 6.50 |

A mixture of these ingredients was cut with ethanol until a 21-sec. viscosity was achieved in a Zahn #2 cup.

The ink was rolled down as a continuous print on each of the following substrates: surface-treated polyethylene and polypropylene films, polyvinylidene chloride-coated cellophane, coated glassine, and Polycote board. The ink adhesion was excellent on the polyethylene and polypropylene films and good on the other substrates. Print quality was good on all of the substrates.

EXAMPLE 13

The procedure of Example 12 was repeated with each of the products of Examples 4, 5, 6, 7, 8, 9, and 10 instead of the product of Example 1. The results were comparable.

What is claimed is:

1. A printing ink resin prepared by (1) reacting a polyol having a functionality of at least 3 with acrylonitrile or an alkyl acrylate at a temperature of about 25° to 75° C., (2) acidifying the adduct product of step (1), and (3) reacting the remaining hydroxyl groups of the adduct with a polyisocyanate and at least one monofunctional reactive hydrogen-containing compound, glycol, or mixture thereof at a temperature of about 60° to 120° C. to form a polymer.

2. The resin of claim 1 wherein the adduct is a diol or a triol.

3. The resin of claim 1 wherein the monofunctional compound is an alcohol, a primary or secondary amine, or a mercaptan.

4. A printing ink comprising the product of claim 1 and a colorant.

* * * * *